United States Patent

Iwamatsu

[11] Patent Number: 5,956,374
[45] Date of Patent: Sep. 21, 1999

[54] JITTER SUPPRESSING CIRCUIT

[75] Inventor: Takanori Iwamatsu, Kawasaki, Japan

[73] Assignee: Fujitsu Limited, Kawasaki, Japan

[21] Appl. No.: 08/715,023

[22] Filed: Sep. 17, 1996

[30] Foreign Application Priority Data

Apr. 4, 1996 [JP] Japan ................................. 8-082609

[51] Int. Cl.⁶ ................................................. H03D 3/00
[52] U.S. Cl. ........................ 375/320; 375/324; 375/332; 375/371; 329/304
[58] Field of Search ................................. 375/320, 324, 375/325, 326, 329, 332, 371, 373, 375, 340, 322; 325/320, 324, 325, 326, 329, 332, 371, 373, 375, 340, 322; 329/304

[56] References Cited

U.S. PATENT DOCUMENTS 5,115,454  5/1992  Kucar ..................................... 375/321
5,579,351  11/1996  Kim ......................................... 375/371
5,661,761  8/1997  Iwamatsu ................................. 375/344

Primary Examiner—Young T. Tse
Attorney, Agent, or Firm—Staas & Halsey

[57] ABSTRACT

A jitter suppressing circuit is provided for suppressing jitter generated in a multistate quadrature amplitude modulation type modulator or demodulator. Based on I- and Q-phase signals containing jitter, a signal point specified by the I- and Q-phase signals is obtained, and a phase difference between the signal point and an ideal signal point closest thereto is detected. Whether the ideal signal point belongs to a predetermined signal point group is then determined. When the result of determination is affirmative, the phase of the signal point specified by the I- and Q-phase signals containing jitter is corrected, on the basis of the detected phase difference.

18 Claims, 16 Drawing Sheets

PRIOR ART

JITTER SUPPRESSING CIRCUIT

BACKGROUND OF THE INVENTION (1) Field of the Invention

The present invention relates to a jitter suppressing circuit, and more particularly, to a jitter suppressing circuit for suppressing jitter generated in a multistate quadrature amplitude modulation (QAM) type modulator or demodulator used in a multiplex radio apparatus, CATV and the like.

(2) Description of the Related Art

There is a demand for a smaller-sized, lower-cost transmitter and receiver of multistate quadrature amplitude modulation type used in a multiplex radio apparatus, CATV, etc. In cases where a frequency converting section in particular is reduced in size and cost, however, the oscillation frequency accuracy of a local oscillator very often lowers, deteriorating the carrier wave. Such deterioration of the carrier wave is called carrier jitter (hereinafter merely referred to as "jitter") and indicates variations of the carrier wave with time. The jitter causes reduction in the line quality, and the larger the number of states of QAM, the greater the adverse influence. The present invention relates to a jitter suppressing circuit for suppressing such jitter.

As an example of a conventional jitter suppressing circuit, FIG. 13 shows a demodulating circuit to which the jitter suppressing circuit is applied. In the demodulating circuit shown in FIG. 13, a mixing section (MIX) 11 performs quadrature detection on a modulated wave (DEM) and outputs I- and Q-phase signals to roll-off filters 12 and 13, respectively. The roll-off filters 12 and 13 shape the waveforms of the respective I- and Q-phase signals. Based on the I- and Q-phase signals whose waveforms have been shaped, a carrier reproduction control section (CR/CONT) 14 detects a phase error of the reproduced carrier wave, and a low-pass filter 15 extracts a low-frequency component from the phase error and supplies the same to a voltage control oscillator 16. The voltage control oscillator 16 reproduces a carrier wave with a frequency corresponding to the output of the low-pass filter 15, and supplies the same to the mixing section 11.

In the jitter suppressing circuit, based on the I- and Q-phase signals supplied from the demodulating circuit and containing jitter, a control section (CONT) 17 obtains a signal point specified by the I- and Q-phase signals, and detects a phase difference θ between this signal point and an original signal point (ideal signal point) closest thereto. An integrator 18 performs time integration on the phase difference θ detected by the control section 17 to remove a noise component therefrom, and supplies the resulting phase difference, or a phase difference Θ, to a phase shifter 21.

Delay elements 19 and 20 for providing a delay of a predetermined time are arranged at a stage preceding the phase shifter 21, and respectively delay the I- and Q-phase signals, which are supplied from the demodulating circuit and contain jitter, by a predetermined period of time. The phase shifter 21 then corrects the phase of the signal point specified by the I- and Q-phase signals by the phase difference Θ output from the integrator 18. This phase correction serves to suppress jitter.

To carry out the phase correction, the phase shifter 21 makes calculations indicated by the following equations (1a) and (1b):

$$I_O = I_I \times \cos\Theta - Q_I \times \sin\Theta \quad (1a)$$

$$Q_O = Q_I \times \cos\Theta + I_I \times \sin\Theta \quad (1b)$$

In the equations, $I_I$ and $Q_I$ respectively represent the I- and Q-phase signals before the jitter suppression which are input to the phase shifter 21, and $I_O$ and $Q_O$ respectively represent the I- and Q-phase signals after the jitter suppression which are output from the phase shifter 21.

FIG. 14 illustrates the internal arrangement of the phase shifter 21 for making the above calculations by means of hardware. In FIG. 14, a ROM 30 is a memory for storing data cosΘ and sinΘ at its data storage locations with addresses Θ, and when supplied with the phase difference Θ from the integrator 18, it outputs cosΘ and sinΘ corresponding to Θ. The data cosΘ is supplied to multipliers 31 and 34, while the data sinΘ is supplied to multipliers 33 and 36. The I-phase signal ($I_I$) before the jitter suppression, which is input to the phase shifter 21, is supplied to the multipliers 31 and 36, while the Q-phase signal ($Q_I$) before the jitter suppression, which also is input to the phase shifter 21, is supplied to the multipliers 34 and 33. The product obtained by the multiplier 31 is supplied to a subtractor 32, and the product obtained by the multiplier 33 is also supplied to the subtractor 32. The subtractor 32 subtracts the product of the multiplier 33 from the product of the multiplier 31 and outputs the resulting difference as the I-phase signal ($I_O$) after jitter suppression. Similarly, the product obtained by the multiplier 34 is supplied to an adder 35, and the product obtained by the multiplier 36 is also supplied to the adder 35. The adder 35 adds these products together and outputs the resulting sum as the Q-phase signal ($Q_O$) after jitter suppression.

FIG. 15(A) illustrates the internal arrangement of the control section 17. Specifically, the control section 17 comprises a ROM 37. The ROM 37 has data storage locations with two-dimensional addresses corresponding to the I- and Q-phase signals supplied from the demodulating circuit and containing jitter, and stores phase difference θ data between each signal point corresponding to two-dimensional address values and a corresponding original signal point (ideal signal point) closest thereto at a corresponding data storage location thereof.

The control section 17 may alternatively comprise an arithmetic unit for calculating the phase difference θ according to the following equation (2):

$$\theta = \tan^{-1}(Q/I) - \tan^{-1}(Q'/I') \quad (2)$$

In the equation, Q and I represent the Q- and I-phase signals supplied from the demodulating circuit and containing jitter, and Q' and I' represent Q- and I-phase signals indicating an original signal point (ideal signal point) closest to the signal point specified by the I- and Q-phase signals containing jitter.

FIG. 15(B) illustrates the internal arrangement of the integrator 18. Specifically, the integrator 18 comprises an accumulator made up of an adder 38 and a flip-flop (FF) 39, and successively adds a newly input phase difference θ to the result of operation of the preceding symbol. Consequently, the integrator 18 integrates the phase difference θ supplied from the control section 17, and outputs the result to the phase shifter 21 as the phase difference Θ.

Thus, the jitter suppressing circuit employs feedforward control in which the phase shifter 21 is operated in accordance with the phase difference Θ detected at the input side thereof, and this permits good follow-up performance with respect to rapid input variations with time such as jitter.

It is here assumed that the conventional demodulating circuit handles a 64-level QAM signal, as shown in FIG. 16. It is also assumed that a signal point which should originally coincide with a signal position P1 is shifted to a signal position P2 due to jitter. In this case, the jitter suppressing circuit locates the signal position P1 which is an ideal signal point closest to the signal position P2, and detects a phase difference θ1 from the ideal signal position P1. Based on this phase difference θ1, jitter is suppressed and the signal position P2 is shifted to the signal position P1 as the ideal signal point.

If, however, jitter is so large that a signal point which should originally coincide with the signal position P1 is shifted to a signal position P3, then a signal position P4 which is another ideal signal point is closest to the signal position P3. Accordingly, the jitter suppressing circuit, which should originally detect a phase difference θ2, detects a phase difference θ3 from the signal position P4 as the ideal signal point, and suppresses jitter based on this phase difference θ3. As a result, jitter is not reduced at all but is enlarged, causing a bit error.

SUMMARY OF THE INVENTION

An object of the present invention is to provide a jitter suppressing circuit which can suppress jitter with accuracy even when the quantity of jitter is large.

To achieve the above object, there is provided a jitter suppressing circuit for suppressing jitter generated in a multistate quadrature amplitude modulation type modulator or demodulator. The jitter suppressing circuit comprises phase difference detecting means for obtaining, based on I- and Q-phase signals containing jitter, a signal point specified by the I- and Q-phase signals, and detecting a phase difference between the signal point and an ideal signal point closest thereto, determining means for determining whether or not the ideal signal point belongs to a predetermined signal point group, and phase correcting means for performing phase correction on the signal point specified by the I- and Q-phase signals containing jitter based on the phase difference detected by the phase difference detecting means when the result of determination by the determining means is affirmative.

There is also provided a jitter suppressing circuit which comprises first phase correcting means for performing, based on a predetermined phase difference supplied thereto, phase correction on a signal point specified by I- and Q-phase signals containing jitter, phase difference detecting means for obtaining, based on I- and Q-phase signals output from the first phase correcting means, a signal point specified by the I- and Q-phase signals, and detecting a phase difference between the signal point and an ideal signal point closest thereto, sending means for sending the phase difference detected by the phase difference detecting means to the first phase correcting means as the predetermined phase difference, delaying means for delaying the I- and Q-phase signals containing jitter by a predetermined time period, and second phase correcting means for performing, based on the phase difference detected by the phase difference detecting means, phase correction on the signal point specified by the I- and Q-phase signals output from the delaying means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments according to the present invention will be hereinafter described with reference to the drawings.

Figure 1:
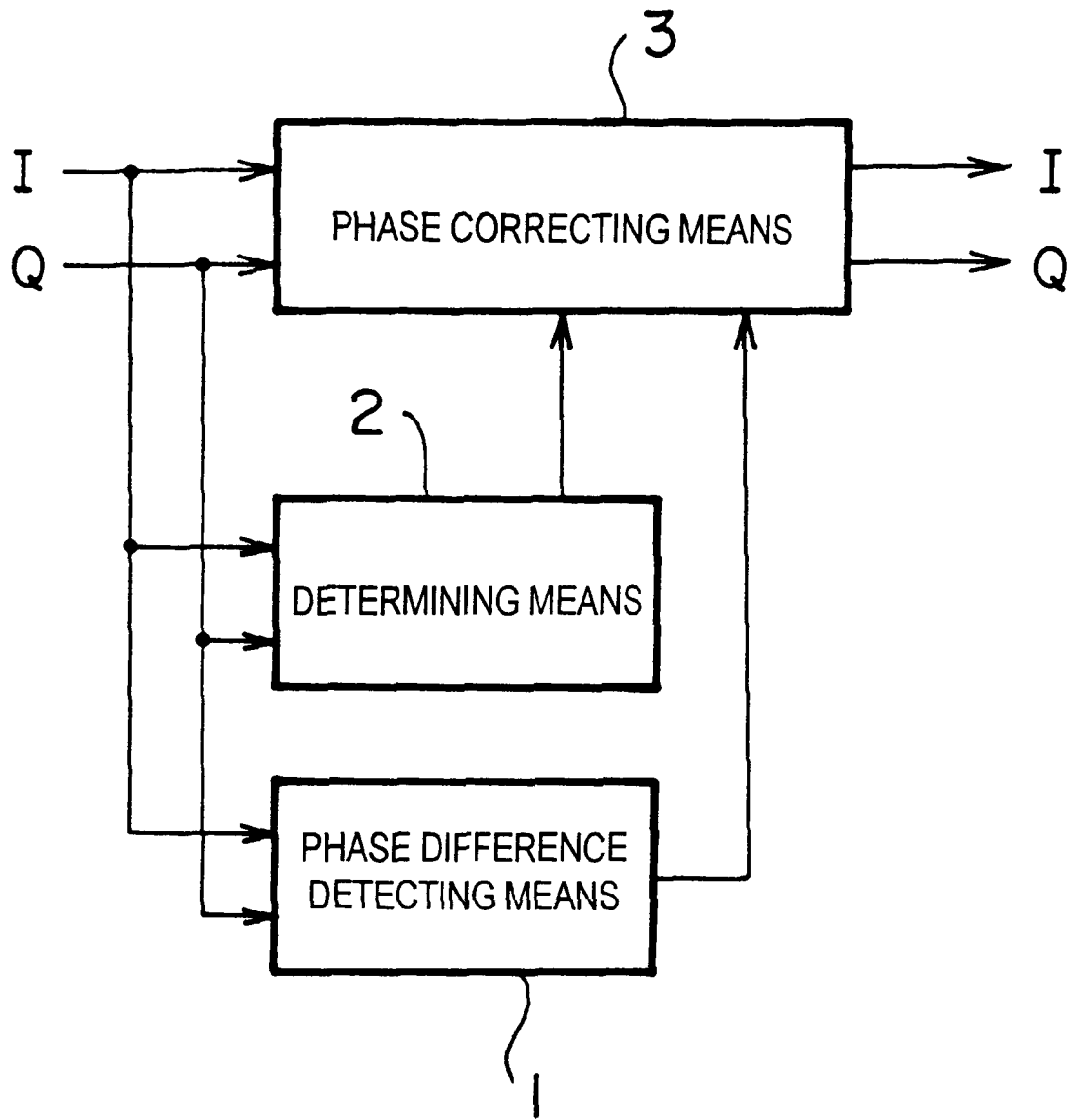
FIG. 1 is a diagram illustrating the principles of the present invention.

Referring first to FIG. 1, a theoretical configuration of a jitter suppressing circuit according to a first embodiment of the present invention will be explained. The first embodiment comprises phase difference detecting means 1 for obtaining, based on I- and Q-phase signals containing jitter, a signal point specified by the I- and Q-phase signals and detecting a phase difference between the signal point and an ideal signal point closest thereto, determining means 2 for determining whether or not the ideal signal point belongs to a predetermined signal point group, and phase correcting means 3 for performing phase correction on the signal point specified by the I- and Q-phase signals containing jitter based on the phase difference detected by the phase difference detecting means 1 when the result of determination by the determining means 2 is affirmative.

A detailed arrangement according to the first embodiment will be described with reference to FIG. 2. Correspondence of the elements shown in FIG. 1 to those shown in FIG. 2 will be explained later following the description of the detailed arrangement.

Figure 2:
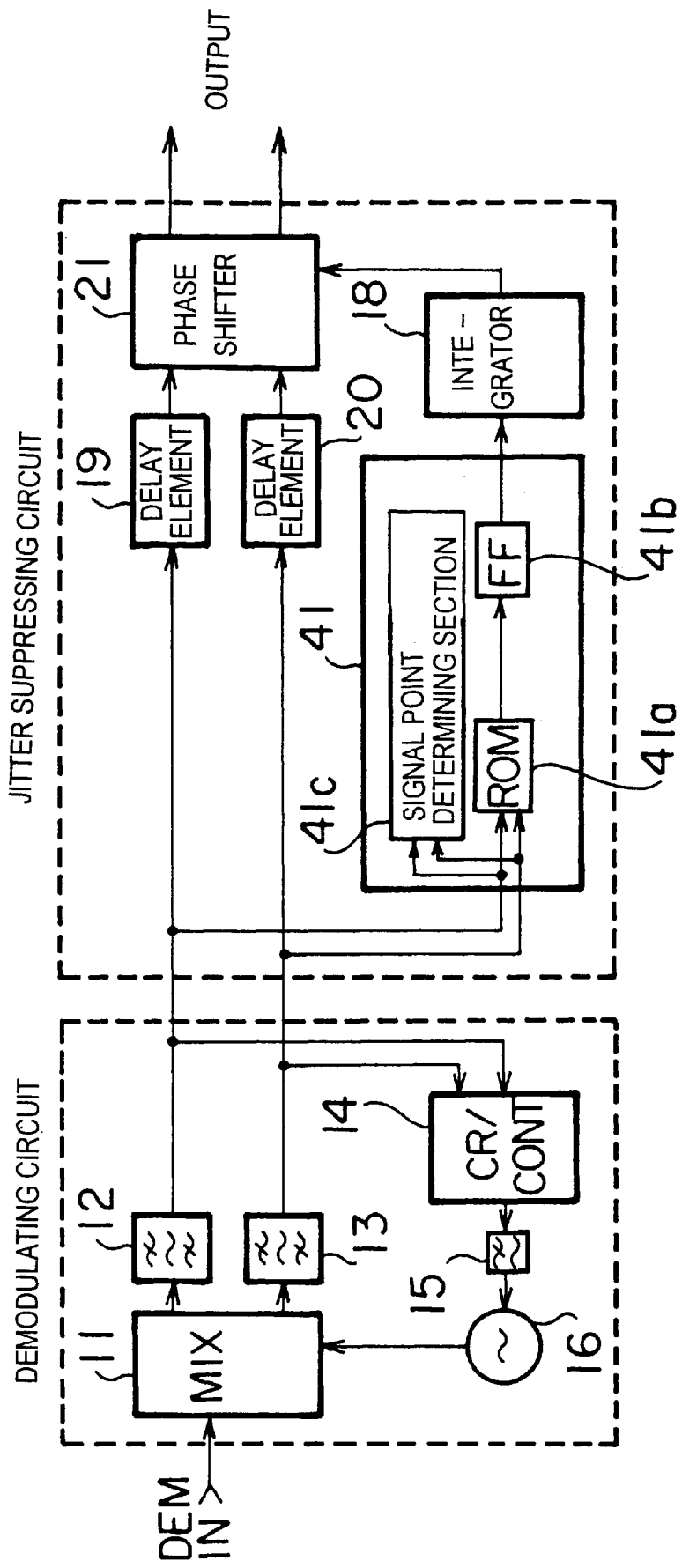
FIG. 2 is a block diagram showing a demodulating section of a receiver including a jitter suppressing circuit according to a first embodiment.
Figure 13:
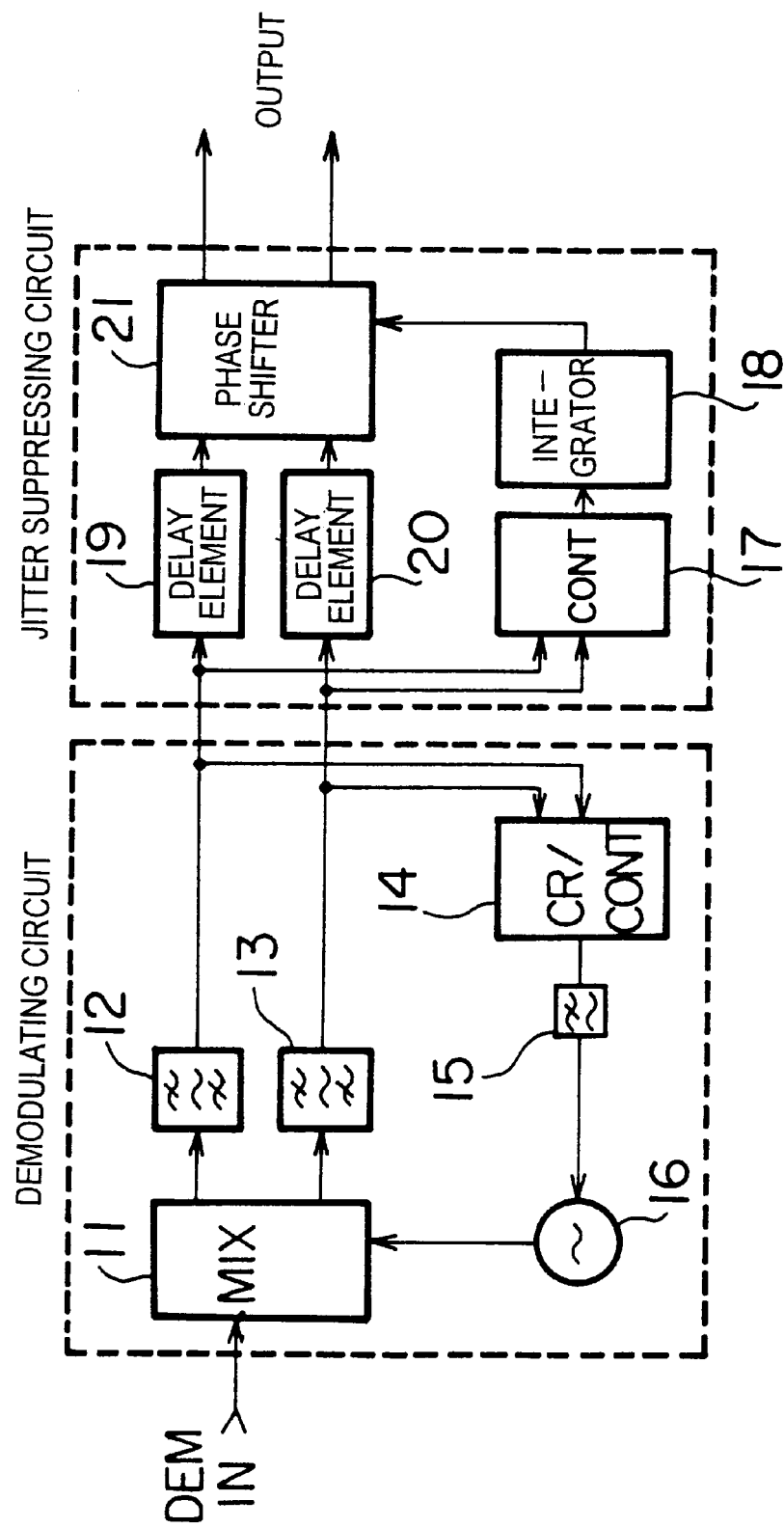
FIG. 13 is a block diagram showing a demodulating section of a receiver including a conventional jitter suppressing circuit.

FIG. 2 is a block diagram showing a demodulating section of a receiver including the jitter suppressing circuit according to the first embodiment. The arrangement shown in FIG. 2 includes elements basically identical with corresponding ones in the arrangement shown in FIG. 13; therefore, identical reference numerals are used to denote such elements and description thereof is omitted.

In the first embodiment, a control section 41 is provided in the jitter suppressing circuit. The control section 41 is supplied with I- and Q-phase signals from the demodulating circuit, and comprises a ROM 41a, a flip-flop (FF) 41b, and a signal point determining section 41c. The ROM 41a has data storage locations with two-dimensional addresses corresponding to the I- and Q-phase signals supplied from the demodulating circuit and containing jitter, and stores phase difference θ data between each signal point corresponding to two-dimensional address values and a corresponding original signal point (ideal signal point) closest thereto at a corresponding data storage location thereof. When the flip-flop 41b is supplied with an update signal, described later, from the signal point determining section 41c, it replaces the data held thereby until then with data currently output from the ROM 41a, and outputs the newly held data to the integrator 18. On the other hand, when the flip-flop 41b is supplied with a hold signal, described later, from the signal point determining section 41c, it continues to hold the data therein as it is, and outputs the same to the integrator 18. In this case, the flip-flop 41b ignores the data currently output from the ROM 41a.

The signal point determining section 41c comprises a ROM. This ROM has data storage locations with two-dimensional addresses corresponding to the I- and Q-phase signals supplied from the demodulating circuit and containing jitter, and stores an update signal which is output when an ideal signal point closest to a signal point corresponding to two-dimensional address values belongs to a predetermined signal point group, and a hold signal which is output when the ideal signal point does not belong to the predetermined signal point group, at corresponding data storage locations thereof. The signal point determining section 41c may alternatively be constituted by a logic circuit.

Specifically, in a quadrature coordinate system of signal constellation, a group of ideal signal points having the same amplitude but large phase differences from one another is set as the predetermined signal point group. For example, in a quadrature coordinate system of 64-level QAM signal constellation shown in FIG. 3, the four signal points with the maximum amplitude cannot be erroneously identified as adjacent signal points with the same amplitude even if their phases are shifted by a maximum of 45° due to jitter. Accordingly, there is a high probability that jitter detected with respect to a signal point corresponding to an ideal signal point belonging to such a signal point group is accurately detected jitter, and therefore, an update signal is output so that jitter may be suppressed based on the detected jitter. On the other hand, there is a possibility that jitter detected with respect to a signal point corresponding to an ideal signal point not belonging to the predetermined signal point group is inaccurately detected jitter; therefore, the detected jitter is ignored and jitter is suppressed based on the jitter previously detected with accuracy.

As a specific method of setting a predetermined signal point group, a range is set by amplitude in the quadrature coordinate system of signal constellation, and those signal points falling within the set range are regarded as signal points constituting the predetermined signal point group. In the case shown in FIG. 3, to identify the four signal points with the maximum amplitude, a circle C1 is considered which divides the four signal points with the maximum amplitude from the eight signal points with the second largest amplitude, and the signal points outside the circle C1 are regarded as signal points belonging to the predetermined signal point group.

Figure 3:
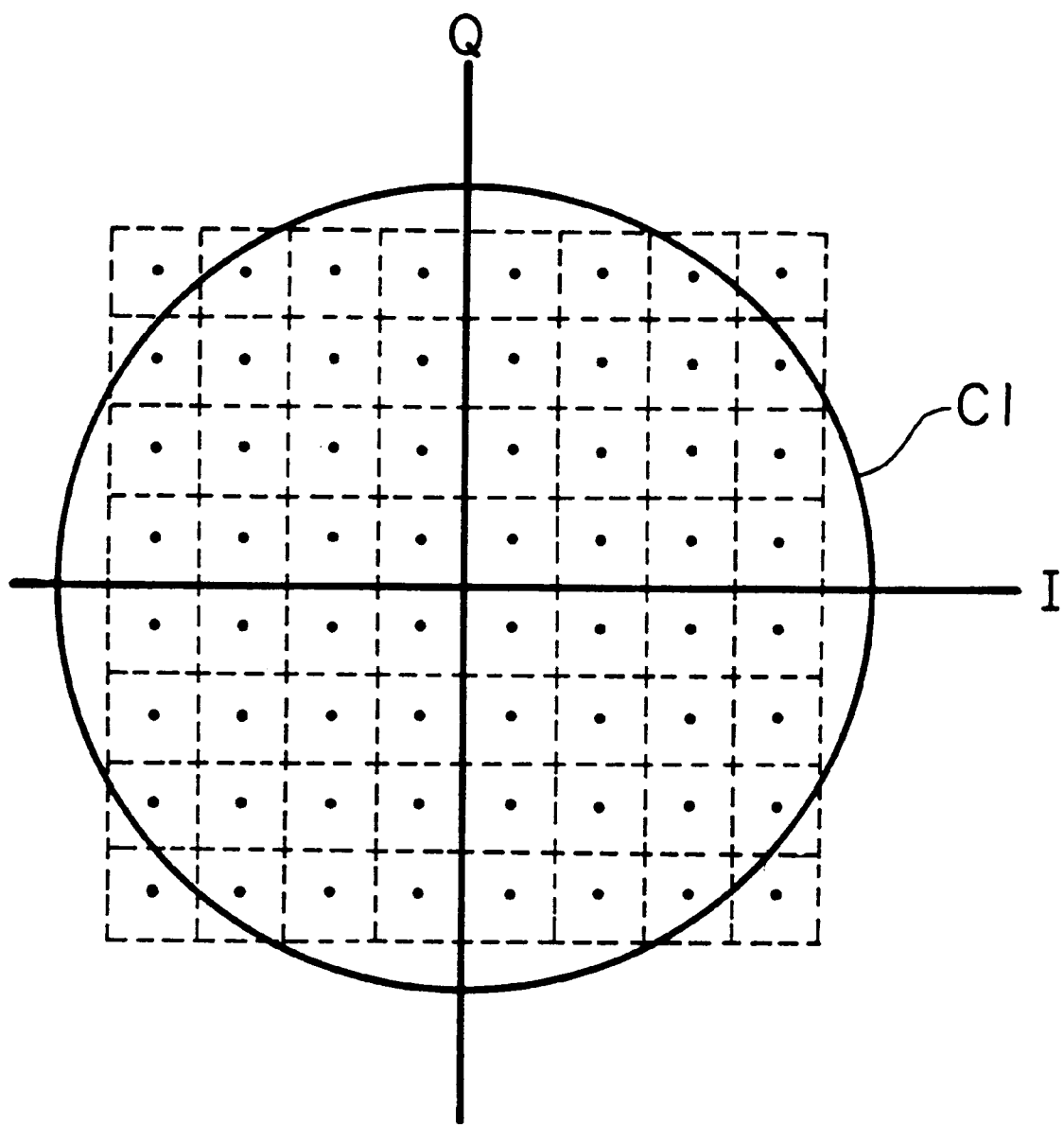
FIG. 3 is a diagram showing the range of a first predetermined signal point group with reference to a quadrature coordinate system of signal constellation.
Figure 4:
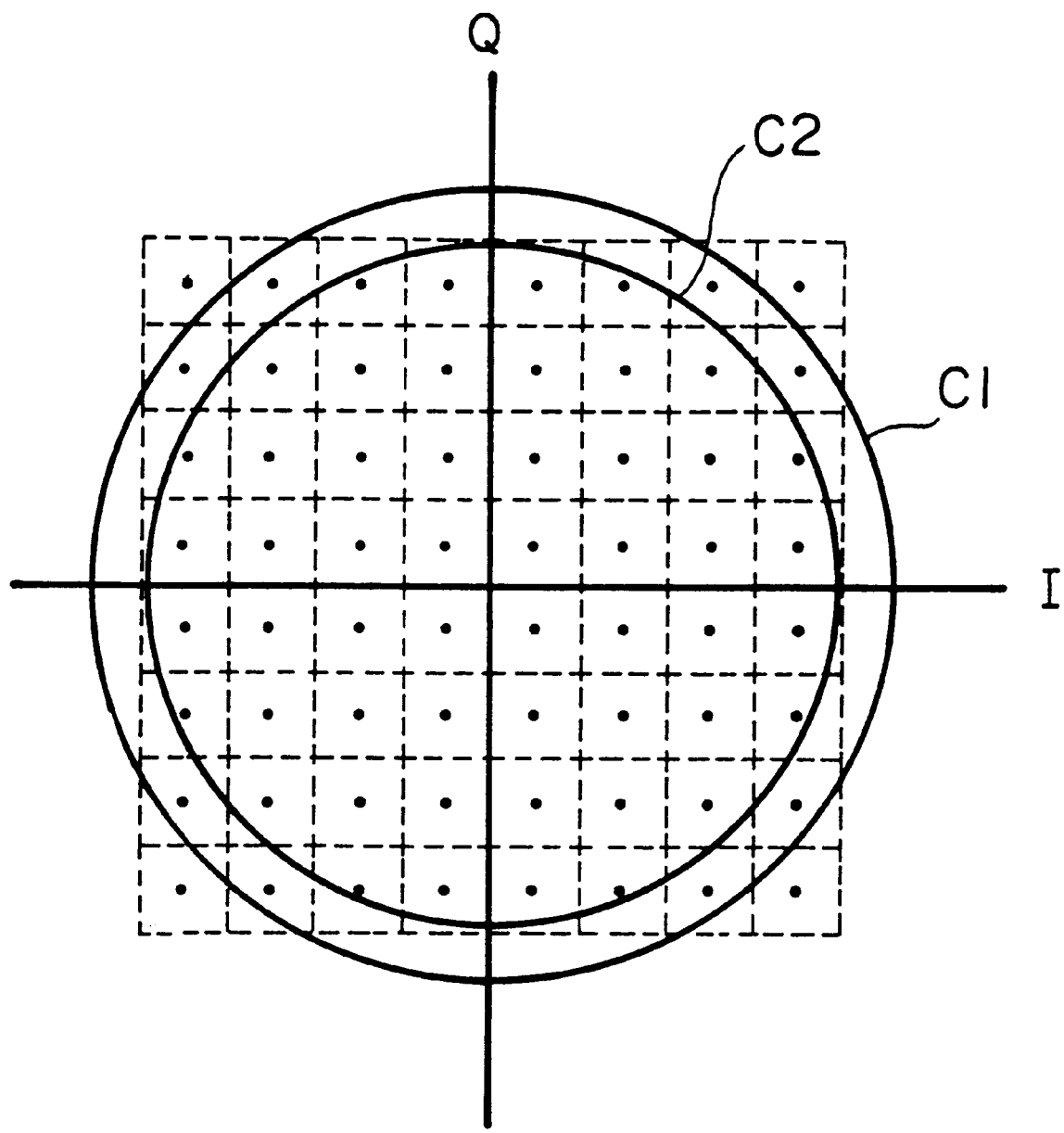
FIG. 4 is a diagram showing the range of a second predetermined signal point group with reference to the quadrature coordinate system of signal constellation.

Also, the eight signal points with the second largest amplitude may be set as a predetermined signal point group, as shown in FIG. 4. In this case, the signal points in the predetermined signal point group are closer to one another than those in the predetermined signal point group shown in FIG. 3, and therefore, jitter accurately detectable with the predetermined signal point group shown in FIG. 4 is not so large as that detectable with the predetermined signal point group shown in FIG. 3. Nevertheless, with the predetermined signal point group shown in FIG. 4, jitter can be suppressed at a frequency of 8/64 (in the case of the predetermined signal point group shown in FIG. 3, jitter suppression takes place at a frequency of 4/64). In order to identify the eight signal points with the second largest amplitude, a circle C2 is considered which divides the eight signal points with the second largest amplitude from the eight signal points with the third largest amplitude, and the signal points which are outside the circle C2 but within the circle C1 are identified as signal points belonging to the predetermined signal point group.

Figure 5:
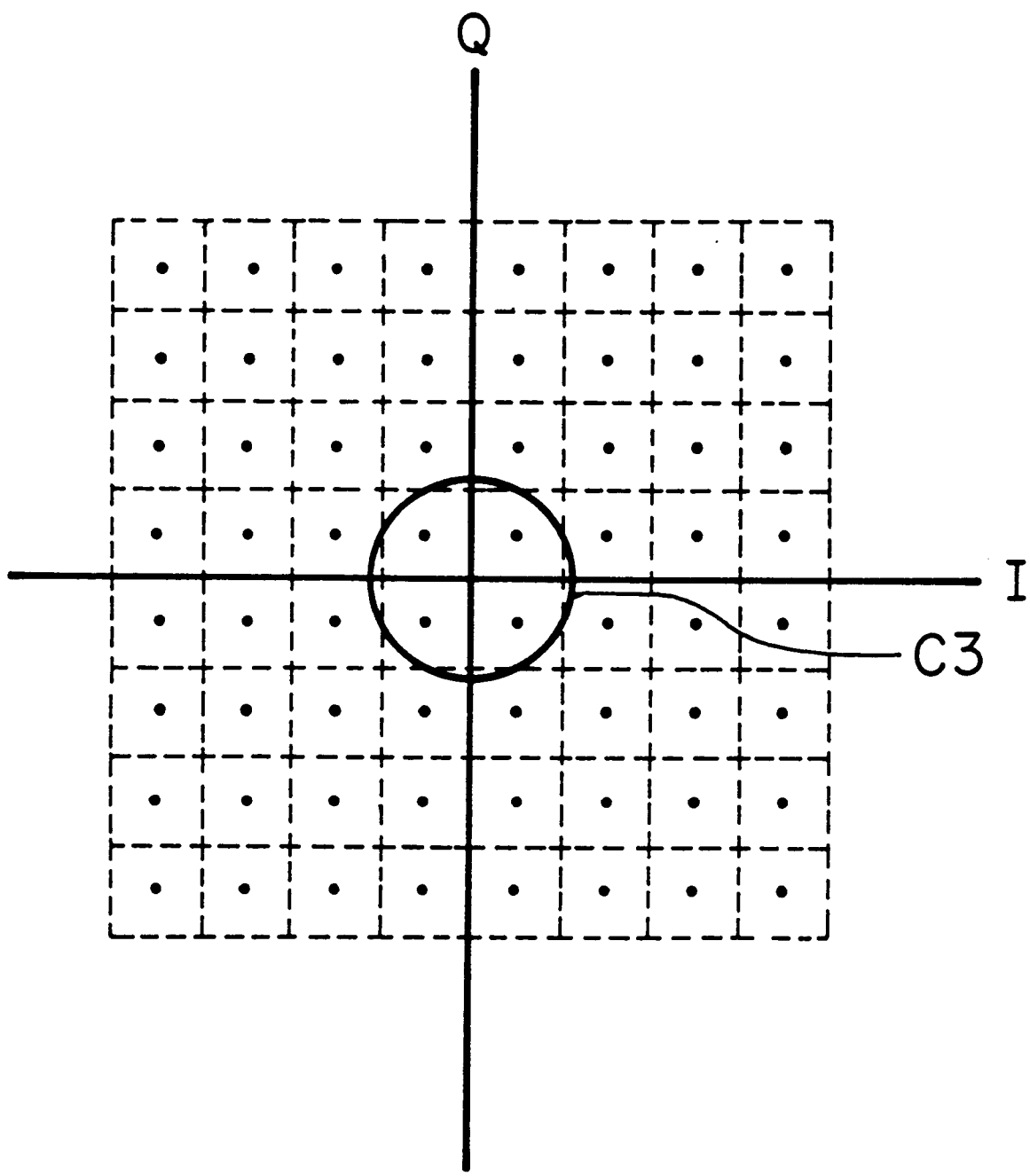
FIG. 5 is a diagram showing the range of a third predetermined signal point group with reference to the quadrature coordinate system of signal constellation.

Further, as shown in FIG. 5, the four signal points with the minimum amplitude may be set as a predetermined signal point group. In this case, jitter can be detected with the same accuracy as that achieved by the predetermined signal point group shown in FIG. 3. To identify the four signal points with the minimum amplitude, a circle C3 is considered which divides the four signal points with the minimum amplitude from the eight signal points with the second smallest amplitude, and the signal points inside the circle C3 are identified as signal points belonging to the predetermined signal point group.

Furthermore, the individual signal points shown in FIGS. 3 to 5 may be combined to constitute a predetermined signal point group.

When the flip-flop 41b is supplied with a hold signal from the signal point determining section 41c, it continues to hold the data therein as it is, and outputs the held data to the integrator 18. Alternatively, the flip-flop 41b may be designed to output a phase difference value "0" to the integrator 18 when it is supplied with a hold signal from the signal point determining section 41c. In this case, the characteristics of the integrator 18 are adjusted so as to obtain similar effects to those achieved in the case where the previous data is continuously retained.

Correspondence of the elements shown in FIG. 1 to those shown in FIG. 2 will be explained. Specifically, the phase difference detecting means 1 shown in FIG. 1 corresponds to the ROM 41a in FIG. 2, the determining means 2 in FIG. 1 corresponds to the signal point determining section 41c in FIG. 2, and the phase correcting means 3 in FIG. 1 corresponds to the phase shifter 21 in FIG. 2.

Figure 6:
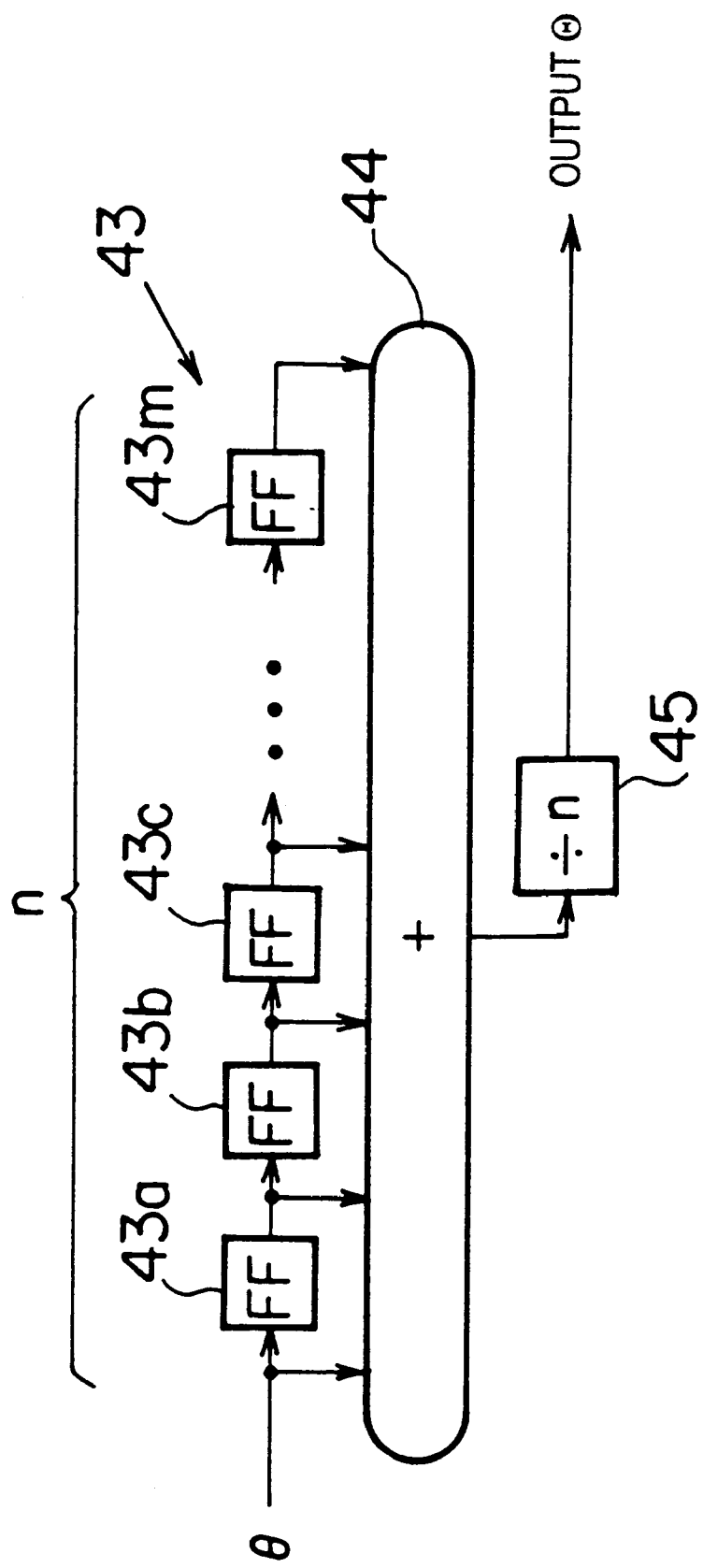
FIG. 6 is a block diagram showing an integrator having another arrangement.
Figure 7:
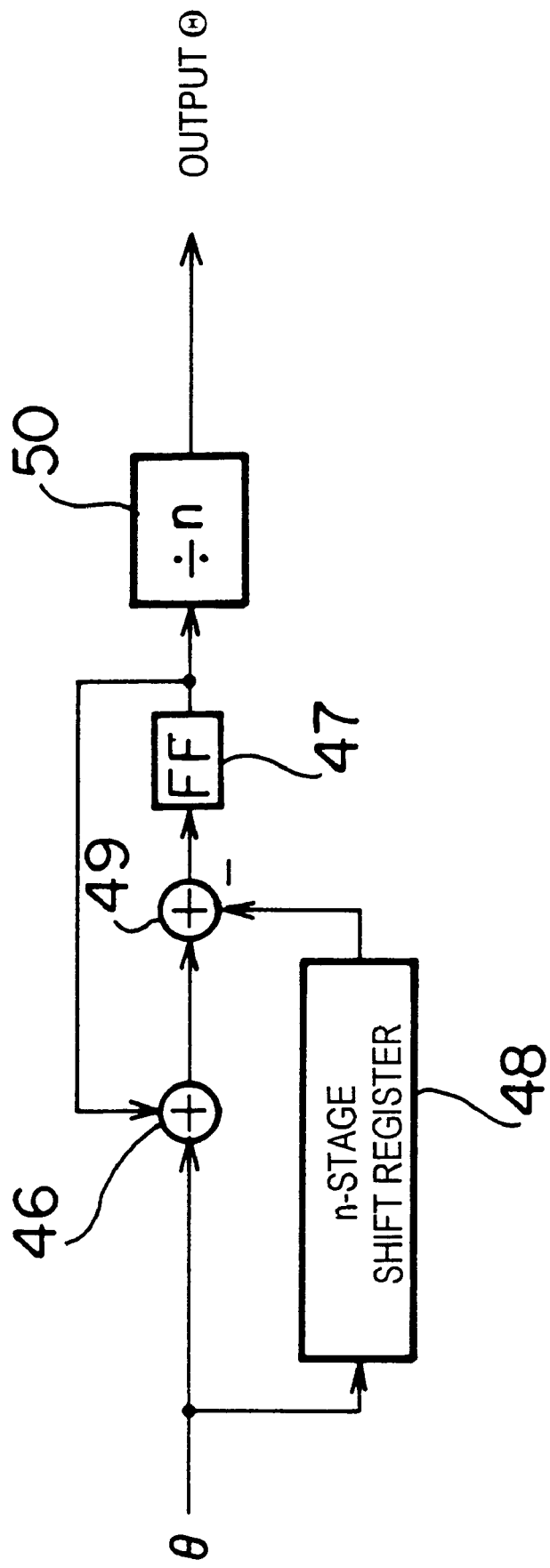
FIG. 7 is a block diagram showing an integrator having still another arrangement.
Figure 15A:
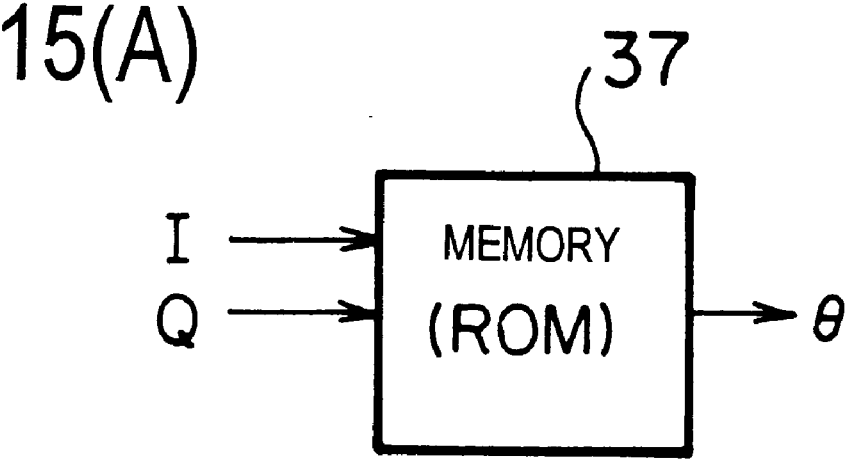
FIG. 15(A) is a diagram showing an arrangement of a control section in the conventional jitter suppressing circuit.
Figure 15B:
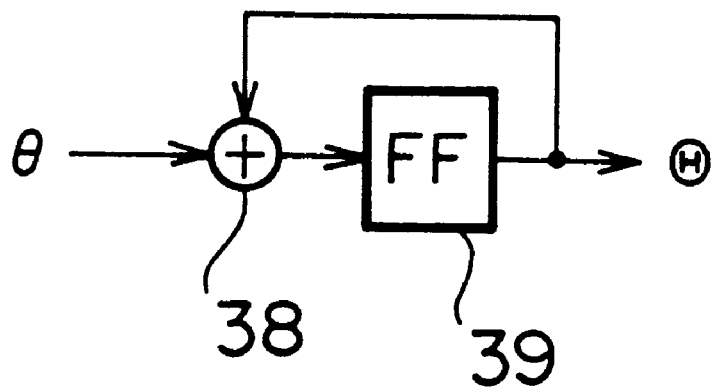
FIG. 15(B) is a diagram showing an arrangement of an integrator in the conventional jitter suppressing circuit.
Figure 16:
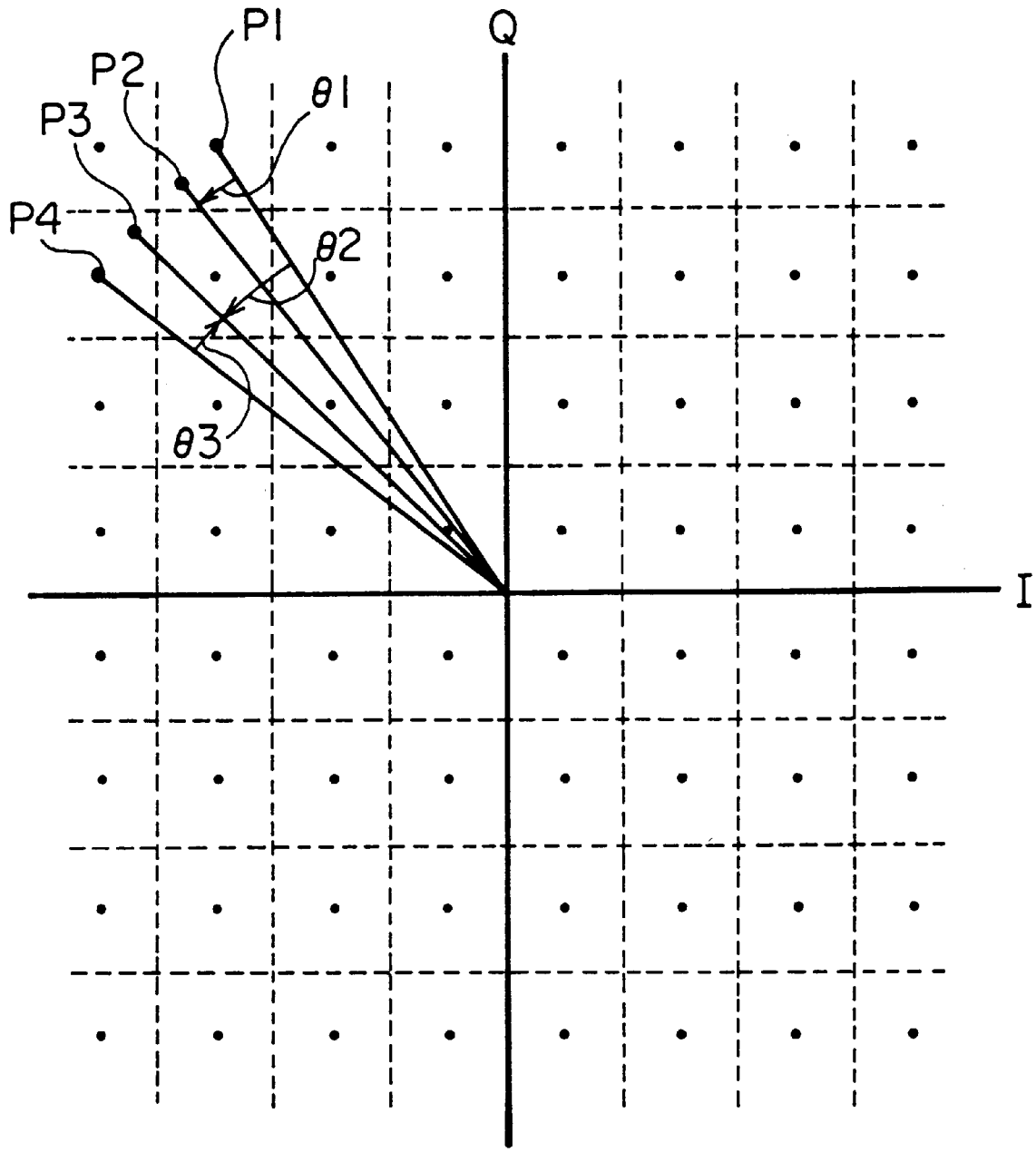
FIG. 16 is a diagram illustrating a problem with a conventional technique with reference to a quadrature coordinate system of signal constellation.

The integrator 18 has an arrangement identical with that shown in FIG. 15(B), but may have an arrangement shown in FIG. 6 or 7.

FIG. 6 is a block diagram of an integrator having another arrangement. As illustrated, a shift register 43, which is made up of n flip-flops (FF) 43a to 43m, is supplied with the phase difference θ detected by the control section 41 and shifts data therein each time a signal point is input. An adder 44 adds up a total of n pieces of data including the input data to the flip-flop 43a and the outputs from the respective flip-flops 43a to 43m, and the resulting sum is divided by n at a divider 45 to obtain an average value of the phase differences θ, which is then output to the phase shifter 21 as the phase difference Θ. In this case, a time period Tn1 which is shorter than a time period Tn necessary for the inputs of n signal points is set in each of the delay elements 19 and 20 as a delay time.

Accordingly, if Tn1 is set to Tn/2, the phase shifter 21 corrects the phase of a signal point on the basis of an average value of n phase differences θ detected with respect to a total of n signal points including this signal point at the center and two sets of n/2 signal points preceding and following the signal point, respectively. If Tn1 is set to a value greater than Tn/2, then the phase shifter 21 corrects the phase of a signal point on the basis of an average value of relatively later phase differences θ obtained with respect to signal points a majority of which are input later than the signal point. Namely, with the integrator shown in FIG. 6, the phase shifter 21 can be operated in response to jitter detected at a desired point of time, compared with the case of using the integrator shown in FIG. 15(B), and thus can be made to quickly respond to currently occurring jitter in particular.

FIG. 7 is a block diagram showing still another integrator arrangement having the same function as the integrator shown in FIG. 6. Specifically, in addition to an adder 46 and a flip-flop 47 configured in the same manner as the adder 38 and the flip-flop 39 shown in FIG. 15(B), an n-stage shift register 48, a subtractor 49 and a divider 50 are provided. Thus, a phase difference which was obtained n signal points before is subtracted from the output value of the adder 46 by means of the n-stage shift register 48 and the subtractor 49. Therefore, the divider 50 is always supplied with the sum of phase differences detected with respect to n signal points, and divides the sum by n. Consequently, like the integrator shown in FIG. 6, this integrator supplies an average value of phase differences θ of n signal points to the phase shifter 21 as the phase difference Θ.

Also in the case of using the integrator shown in FIG. 7, the time period Tn1 which is shorter than the time period Tn necessary for the inputs of n signal points is set in each of the delay elements 19 and 20 as a delay time.

Figure 8:
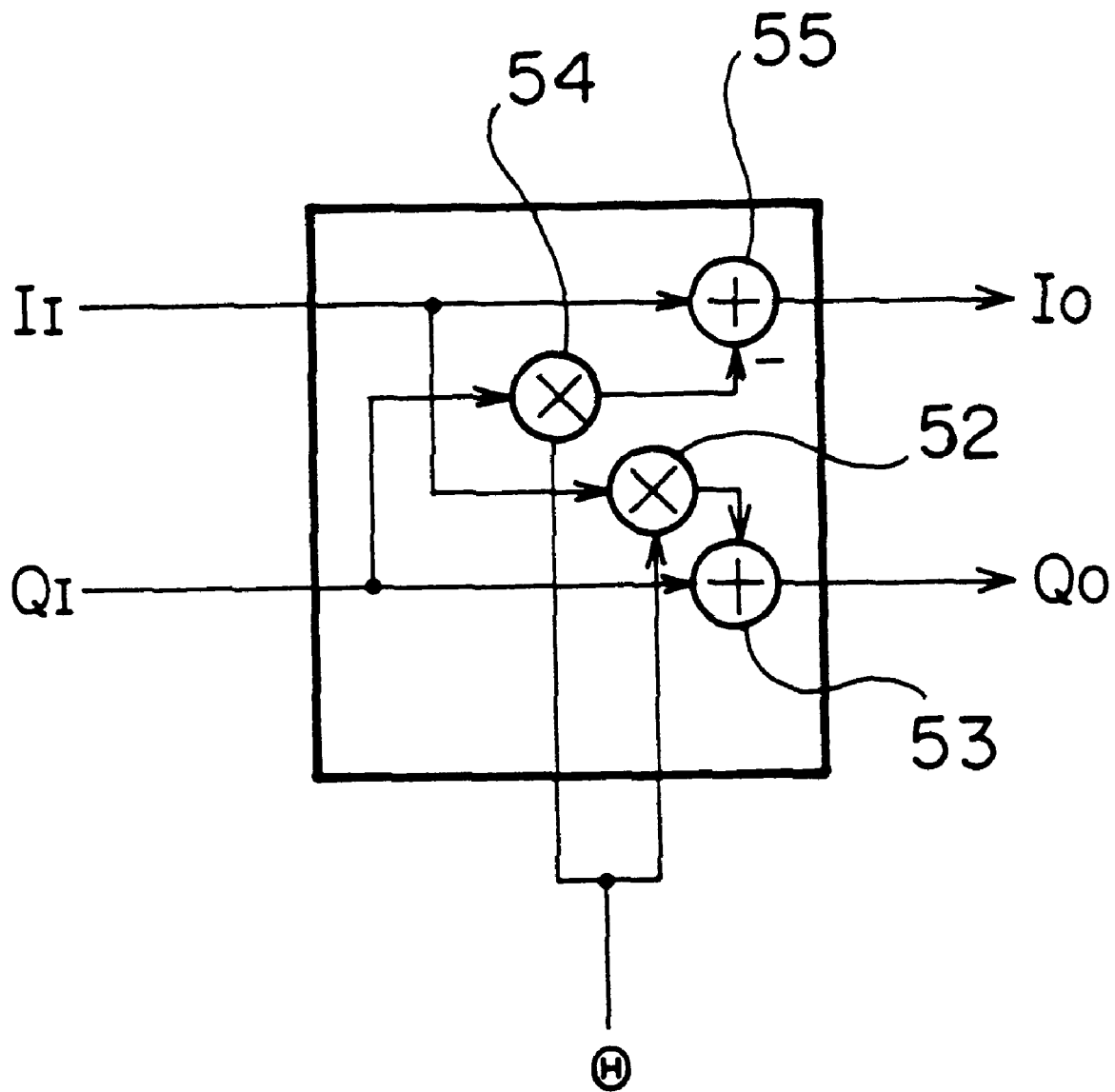
FIG. 8 is a block diagram showing a phase shifter having another arrangement.
Figure 14:
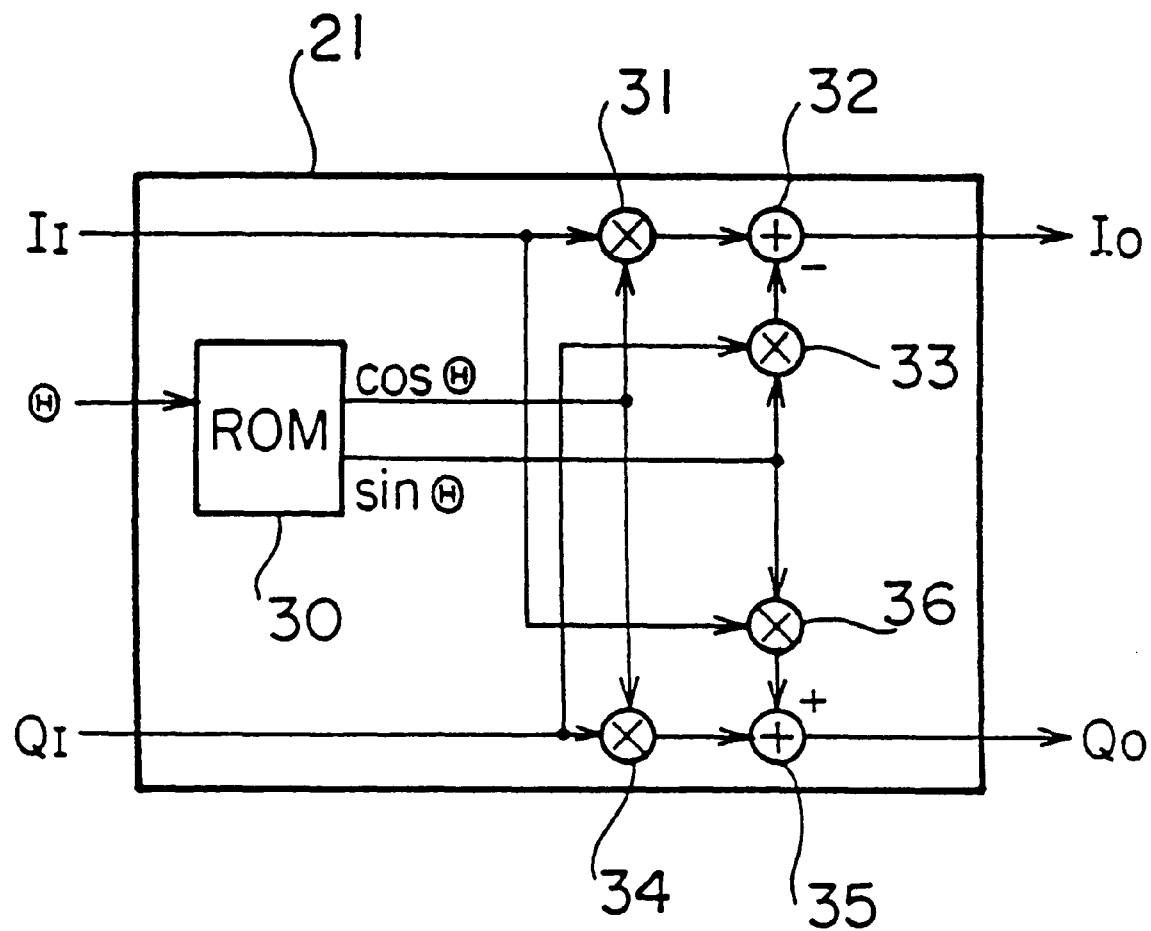
FIG. 14 is a diagram showing an arrangement of a phase shifter in the conventional jitter suppressing circuit.

The phase shifter 21 has an arrangement identical with that shown in FIG. 14, but may alternatively have an arrangement shown in FIG. 8.

Generally, the magnitude of jitter (phase difference Θ) has an upper limit of 10° to 20° and takes a relatively small value. Especially, the larger the number of states of QAM, the smaller the magnitude of jitter assumedly becomes. In the case where the phase difference Θ is small, cosΘ=1 and sinΘ=0 hold nearly true where Θ is expressed in circular measure, and the aforementioned equations (1a) and (1b) can be transformed to the following equations (3a) and (3b), respectively:

$$I_O = I_I - Q_I \times \Theta \quad (3a)$$

$$Q_O = Q_I + I_I \times \Theta \quad (3b)$$

The phase shifter shown in FIG. 8 has a hardware configuration capable of making the calculations indicated by the respective equations (3a) and (3b). In FIG. 8, a multiplier 52 multiplies the I-phase signal ($I_I$) by the phase difference Θ supplied from the integrator 18, and an adder 53 adds up the output value of the multiplier 52 and the Q-phase signal ($Q_I$) and outputs the resulting sum as the Q-phase signal ($Q_O$) after the phase correction. Similarly, a multiplier 54 multiplies the Q-phase signal ($Q_I$) by the phase difference Θ supplied from the integrator 18, and a subtractor 55 subtracts the output value of the multiplier 54 from the I-phase signal ($I_I$) and outputs the resulting difference as the I-phase signal ($I_O$) after the phase correction.

The phase shifter shown in FIG. 8 does not require a ROM and can reduce the number of multipliers by half, as compared with the phase shifter shown in FIG. 14.

A second embodiment will be now described.

Figure 9:
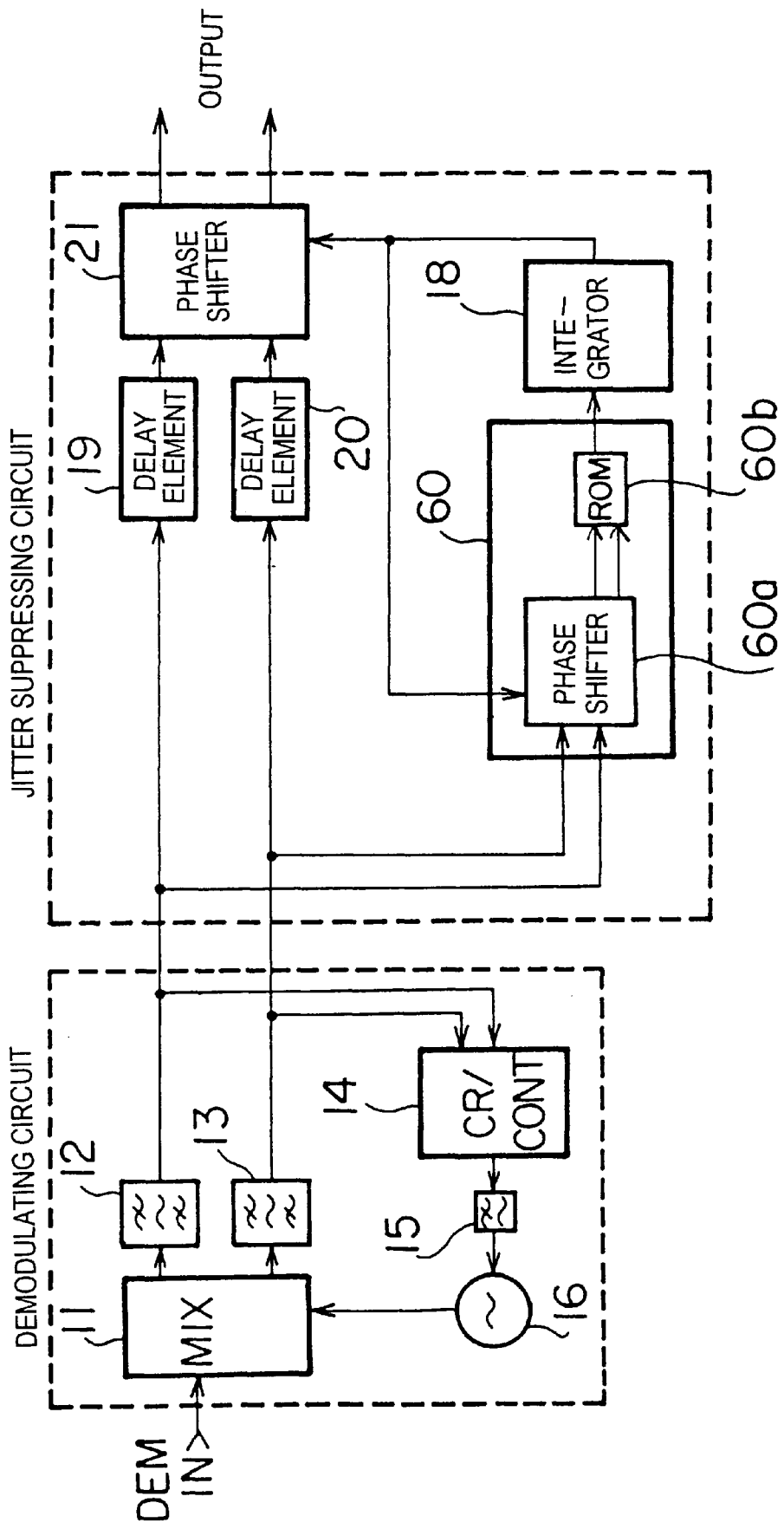
FIG. 9 is a block diagram showing a demodulating section of a receiver including a jitter suppressing circuit according to a second embodiment.

FIG. 9 is a block diagram showing a demodulating section of a receiver including a jitter suppressing circuit according to the second embodiment. The arrangement shown in FIG. 9 also includes elements basically identical with corresponding ones in the arrangement shown in FIG. 13; therefore, identical reference numerals are used to denote such elements and description thereof is omitted.

In the second embodiment, the jitter suppressing circuit includes a control section 60. The control section 60 comprises a phase shifter 60a and a ROM 60b. The phase shifter 60a has an arrangement exactly identical with that of the phase shifter 21 and is supplied directly with the I- and Q-phase signals, and not through delay elements. The ROM 60b is exactly the same as the ROM 37 shown in FIG. 15(A). The ROM 60b has data storage locations with two-dimensional addresses corresponding to the I- and Q-phase signals, and stores phase difference θ data between each signal point corresponding to two-dimensional address values and a corresponding original signal point (ideal signal point) closest thereto at a corresponding data storage location thereof.

Figure 10:
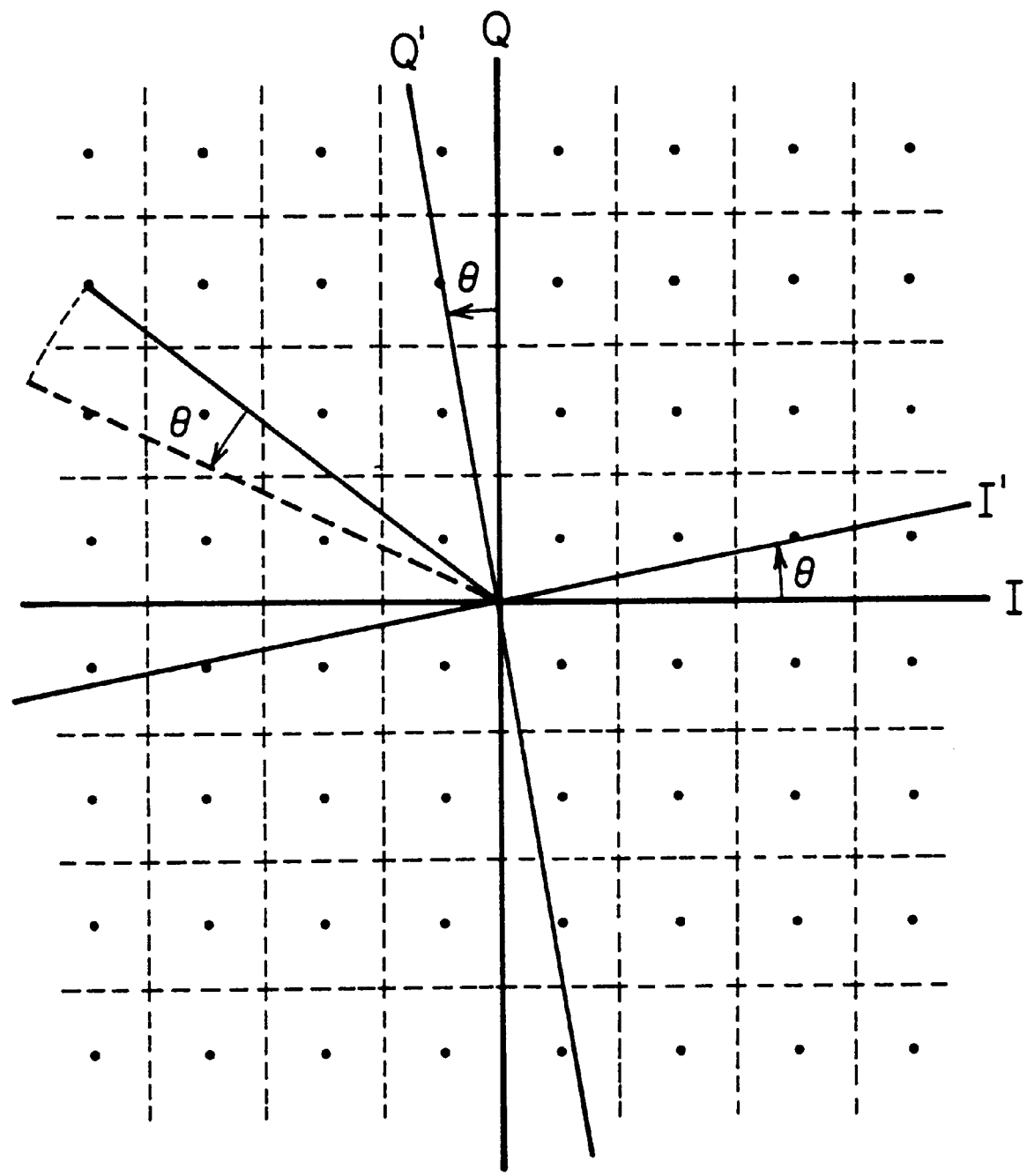
FIG. 10 is a diagram illustrating rotation of I and Q axes according to the second embodiment.

Jitter does not suddenly take a large value but gradually increases, and therefore, the I and Q axes in the phase shifter 60a are rotated by θ, as shown in FIG. 10, as soon as the phase difference θ occurs so that the phase difference may be absorbed by means of the rotated I' and Q' axes. This prevents the signal point from approaching too much an adjacent ideal signal point due to an excessive increase in jitter. The angle θ of the above interim rotation of the I and Q axes is integrated for a predetermined time period, and based on the resulting integral, the phase shifter 21 performs jitter suppression on the signal point which has been delayed by the predetermined time period.

The integrator 18 in the second embodiment may be configured in the same manner as the integrator shown in FIG. 6 or 7. Also, the phase shifters 21 and 60a may each have an arrangement identical with that of the phase shifter shown in FIG. 8.

A third embodiment will be now described.

Figure 11:
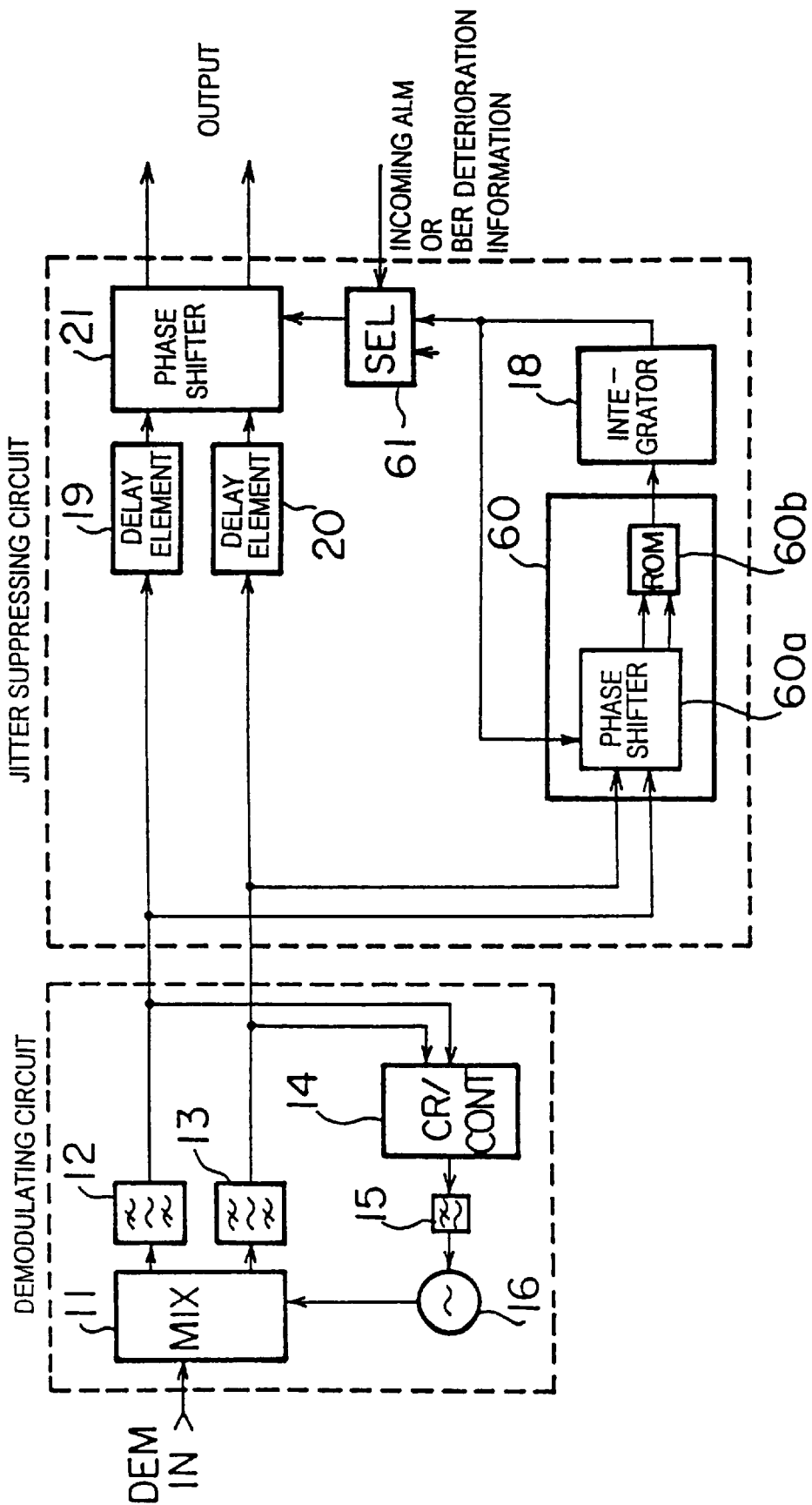
FIG. 11 is a block diagram showing a demodulating section of a receiver including a jitter suppressing circuit according to a third embodiment.

FIG. 11 is a block diagram showing a demodulating section of a receiver including a jitter suppressing circuit according to the third embodiment. The arrangement of the third embodiment is basically identical with that of the second embodiment; therefore, identical reference numerals are used to denote identical elements and description of such elements is omitted.

In the third embodiment, a selector 61 is provided at an input of the phase shifter 21 to which the phase difference Θ is input. The selector 61 is supplied with an incoming alarm or BER deterioration information. The incoming alarm is an alarm generated when frames are asynchronous in the receiver or an alarm generated when error correction is frequently carried out. The BER deterioration information is an alarm generated when the bit error rate becomes greater than or equal to a reference value. These alarms are generated when normal reception cannot be achieved due to an initial-stage operation or an influence of noise or the like, and while such an alarm is generated, suppressing jitter by the jitter suppressing circuit itself is meaningless. Accordingly, while such an alarm is input, the selector 61 blocks the supply of the phase difference Θ from the integrator 18 to the phase shifter 21, and supplies a phase difference of "0" to the phase shifter 21 instead.

Consequently, erroneous operation of the jitter suppressing circuit can be prevented.

The selector 61 maybe applied to the first embodiment described above.

A fourth embodiment will be now described.

Figure 12:
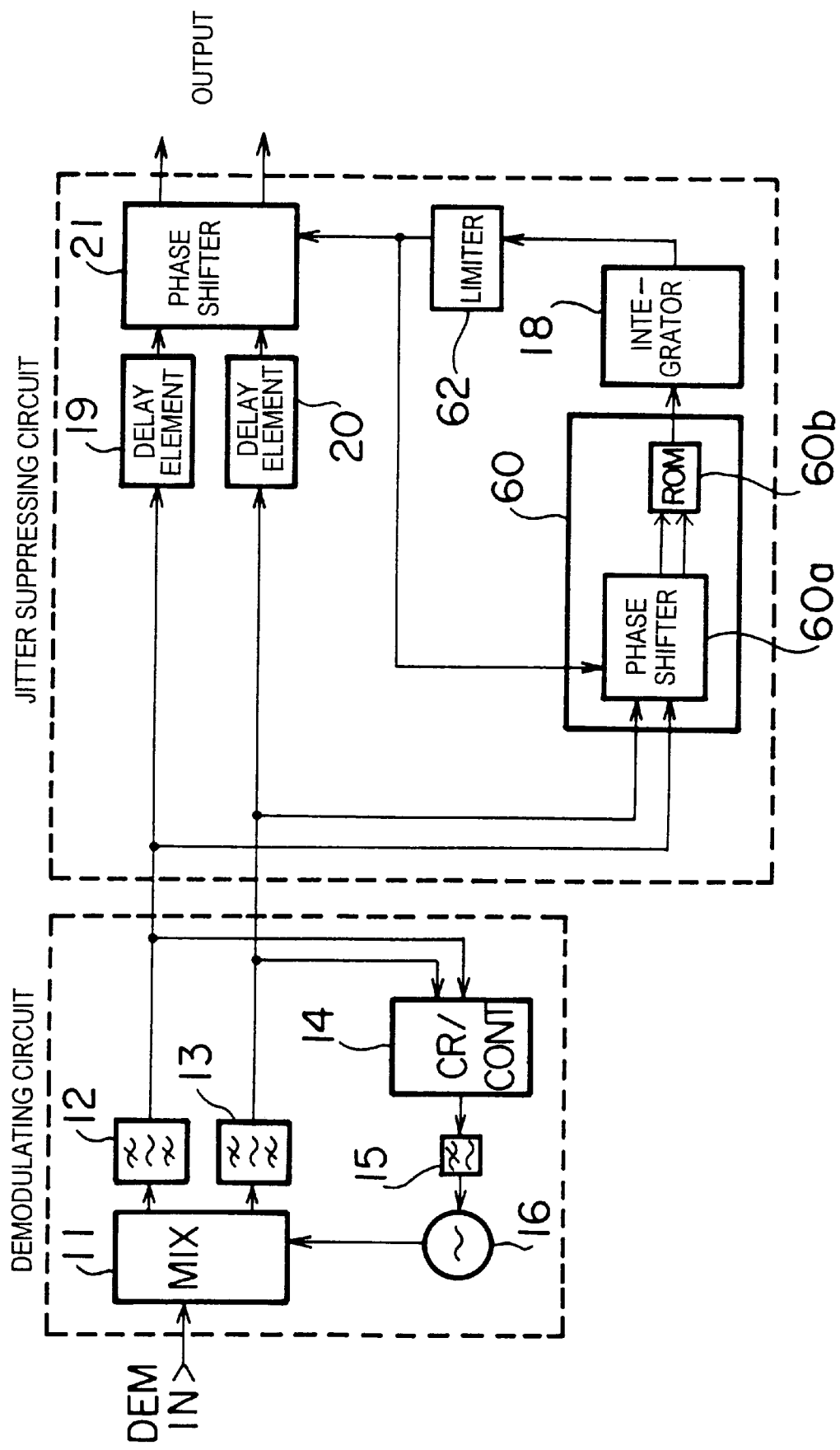
FIG. 12 is a block diagram showing a demodulating section of a receiver including a jitter suppressing circuit according to a fourth embodiment.

FIG. 12 is a block diagram showing a demodulating section of a receiver including a jitter suppressing circuit according to the fourth embodiment. The arrangement of the fourth embodiment is basically identical with that of the second embodiment; therefore, identical reference numerals are used to denote identical elements and description of such elements is omitted.

In the fourth embodiment, a limiter 62 is provided at the output of the integrator 18 from which the phase difference Θ is output. Jitter in itself takes a relatively small value as mentioned above, and therefore, the phase difference Θ is limited to a given range by means of the limiter 62. Consequently, it is possible to prevent the jitter suppression from being carried out erroneously based on large erroneous jitter caused by noise or the like. The limit or boundary value of the limiter 62 is determined suitably depending on the number of states of QAM and the system configuration.

The limiter 62 may be applied to the first embodiment described above.

In the foregoing embodiments, the present invention is applied to a demodulating section of a receiver including a jitter suppressing circuit, but may alternatively be applied to a modulating section of a transmitter including a jitter suppressing circuit.

According to the present invention, based on input I- and Q-phase signals containing jitter, a signal point specified by the I- and Q-phase signals is obtained, and a phase difference between this signal point and an ideal signal point closest thereto is detected, as described above. Also, it is determined whether or not the ideal signal point belongs to a predetermined signal point group. As a result of this determination, it can be judged that there is a relatively small possibility that the signal point specified by currently input I- and Q-phase signals will be erroneously regarded as indicating an adjacent ideal signal point when the signals contain jitter, and that there is a high probability that the detected jitter indicates an accurate value. Only in such cases, the signal point specified by the I- and Q-phase signals containing jitter is subjected to phase correction based on the detected phase difference.

Consequently, jitter can be suppressed with accuracy even when the quantity of jitter is large.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A jitter suppressing circuit for suppressing jitter in a multistate quadrature amplitude modulation demodulator, comprising:

a phase difference detecting unit that obtains a signal point based on an I-phase signal and a corresponding Q-phase signal and that detects a phase difference from the signal point to a closest ideal signal point, the I-phase signal and the Q-phase signal containing jitter;

a determining unit that determines whether the ideal signal point is included in a predetermined signal point group; and a phase correcting unit that performs phase correction on the I- and Q-phase signals based on the detected phase difference when the ideal signal point is included in the predetermined signal point group.

2. The jitter suppressing circuit according to claim 1, wherein said phase correcting unit performs phase correction on the I- and Q-phase signals based on a previously detected phase difference when the ideal signal point is not included in the predetermined signal point group.

3. The jitter suppressing circuit according to claim 1, wherein said phase correcting unit does not perform phase correction on the signal point when the ideal signal point is not in the predetermined signal point group.

4. The jitter suppressing circuit according to claim 1, wherein the predetermined signal point group comprises a group of signal points with a maximum amplitude in a quadrature coordinate system for signal constellation.

5. The jitter suppressing circuit according to claim 1, wherein the predetermined signal point group comprises a group of signal points with a second largest amplitude in a quadrature coordinate system for signal constellation.

6. The jitter suppressing circuit according to claim 1, wherein the predetermined signal point group comprises a group of signal points with a minimum amplitude in a quadrature coordinate system for signal constellation.

7. The jitter suppressing circuit according to claim 1, further comprising an integrator that integrates the detected phase difference, and wherein said phase correcting unit includes delaying means for delaying each of the I- and Q-phase signals by a predetermined delay time, and performs phase correction on the signal point in accordance with an output value of said integrator.

8. The jitter suppressing circuit according to claim 7, wherein said integrator includes a summing unit that generates a sum of a first predetermined number of phase differences detected by said phase difference detecting unit during a predetermined time period, and a divider that divides the sum by the predetermined number; and the predetermined delay time is smaller than the predetermined time period.

9. The jitter suppressing circuit according to claim 8, wherein said predetermined delay time is one-half of the predetermined time period.

10. The jitter suppressing circuit according to claim 8, wherein the summing unit includes:

a shift register having a second predetermined number of stages that respectively receive successive phase differences detected by said phase difference detecting unit, the second predetermined number equaling the first predetermined number; and an adder that adds together the successive phase differences respectively received at the stages of the shift register.

11. The jitter suppressing circuit according to claim 8, wherein the summing unit includes:

a shift register having a second predetermined number of stages and phase differences detected by said phase difference detecting unit, the second predetermined number equalling the first predetermined number;

an accumulator that generates an output value by adding together phase differences respectively stored in the stages of the shift register; and a subtractor that subtracts from the output value a phase difference output from the shift register.

12. The jitter suppressing circuit according to claim 1, wherein said phase correcting unit includes:
   a first multiplier that multiplies the I-phase signal by the detected phase difference to generate a first product;
   an adder that adds the first product and the Q-phase signal to generate a phase-corrected Q-phase signal;
   a second multiplier that multiplies the Q-phase signal by the detected phase difference to generate a second product; and
   a subtractor that subtracts the second product from the I-phase signal to generate a phase-corrected I-phase signal.

13. The jitter suppressing circuit according to claim 1, further comprising a halting unit that prevents said phase correcting unit from performing phase correction during at least one of asynchronous operation and an occurrence of noise.

14. The jitter suppressing circuit according to claim 1, further comprising:
   an integrator that integrates the detected phase difference to generate a resulting integral; and
   a limiter that limits the detected phase difference when the resulting integral exceeds a predetermined boundary value.

15. A jitter suppressing circuit for suppressing jitter generated in a multistate quadrature amplitude modulation demodulator, comprising:
   a first phase correcting unit that performs phase correction on an I-phase signal and a corresponding Q-phase signal, the I- and Q-phase signals containing jitter and the phase correction being based on a predetermined phase difference;
   a phase difference detecting unit that obtains a signal point based on the I- and Q-phase signals, detects a phase difference from the signal point to a closest ideal signal point, and supplies the detected phase difference as the predetermined phase difference;
   delaying means for delaying the I- and Q-phase signals by a predetermined delay time; and
   a second phase correcting unit that performs phase correction on the delayed I- and Q-phase signals based on the detected phase difference.

16. The jitter suppressing circuit according to claim 15, wherein each of said first and second phase correcting units includes:
   a first multiplier that multiplies a respective one of the I-phase signal and the delayed I-phase signal by the detected phase difference to generate a first product;
   an adder that adds the first product to the respective one of the Q-phase signal and the delayed Q-phase signal to generate a respective phase-corrected Q-phase signal;
   a second multiplier that multiplies a respective one of the Q-phase signal and the delayed Q-phase signal by the detected phase difference to generate a second product; and
   a subtractor that subtracts the second product from the respective one of the I-phase signal I-phase signal after phase correction and the delayed I-phase signal to generate a phase-corrected I-phase signal.

17. The jitter suppressing circuit according to claim 15, further comprising:
   a halting unit that prevents said second phase correcting unit from performing phase correction during asynchronous operation and during occurrence of noise.

18. The jitter suppressing circuit according to claim 15, further comprising:
   an integrator that integrates the detected phase difference; and
   a limiter that limits the detected phase difference when the resulting integral exceeds a predetermined boundary value.

* * * * *